United States Patent
Ahmed et al.

(10) Patent No.: US 9,467,235 B1
(45) Date of Patent: Oct. 11, 2016

(54) CIRCUITS, SYSTEMS AND METHODS OF HYBRID ELECTROMAGNETIC AND PIEZOELECTRIC COMMUNICATORS

(71) Applicants: Walid Khairy Mohamed Ahmed, Tinton Falls, NJ (US); Mohsen Sarraf, Rumson, NJ (US); Xiaopeng Huang, Somerset, NJ (US)

(72) Inventors: Walid Khairy Mohamed Ahmed, Tinton Falls, NJ (US); Mohsen Sarraf, Rumson, NJ (US); Xiaopeng Huang, Somerset, NJ (US)

( * ) Notice: Subject to any disclaimer, the term of this patent is extended or adjusted under 35 U.S.C. 154(b) by 0 days.

(21) Appl. No.: 14/613,166

(22) Filed: Feb. 3, 2015

Related U.S. Application Data

(63) Continuation of application No. 14/563,882, filed on Dec. 8, 2014.

(51) Int. Cl.
*H04B 11/00* (2006.01)

(52) U.S. Cl.
CPC .................................. *H04B 11/00* (2013.01)

(58) Field of Classification Search
CPC ......... B32B 3/10; B29C 70/34; C08L 63/00; C23C 14/32; G01N 29/00; G06F 3/0484; H04L 63/061; H04L 9/00; H04R 1/10
USPC ......... 73/591; 204/192.13; 380/427; 381/74; 428/156; 439/660; 463/39; 702/58, 63, 702/150; 703/2, 7, 21; 706/33; 710/110, 710/106
See application file for complete search history.

(56) References Cited

U.S. PATENT DOCUMENTS

| | | | | |
|---|---|---|---|---|
| 3,555,189 A | * | 1/1971 | Quatse | 379/373.01 |
| 3,706,982 A | * | 12/1972 | Gehman | 340/539.1 |
| 3,709,084 A | * | 1/1973 | Stobaugh | 84/726 |
| 3,726,334 A | * | 4/1973 | Sallberg et al. | 164/155.3 |
| 3,727,216 A | * | 4/1973 | Antonio | 342/28 |
| 3,727,822 A | * | 4/1973 | Umbaugh | 228/1.1 |
| 3,735,323 A | * | 5/1973 | Marscher et al. | 338/41 |
| 3,740,532 A | * | 6/1973 | Esch | 377/45 |
| 3,836,949 A | * | 9/1974 | Ergon | 367/95 |
| 4,235,153 A | * | 11/1980 | Rinde et al. | 91/1 |
| 4,361,060 A | * | 11/1982 | Smyth | 477/78 |
| 4,523,472 A | * | 6/1985 | Blades | 73/632 |
| 4,766,988 A | * | 8/1988 | Seibert | 477/172 |
| 5,186,175 A | * | 2/1993 | Hirama et al. | 600/447 |
| 5,194,684 A | * | 3/1993 | Lisle et al. | 84/659 |
| 5,477,859 A | * | 12/1995 | Engeler | 600/447 |
| 5,517,996 A | * | 5/1996 | Okada et al. | 600/447 |
| 5,953,694 A | * | 9/1999 | Pillekamp | 704/201 |
| 6,005,954 A | * | 12/1999 | Weinfurtner | 381/312 |
| 6,158,288 A | * | 12/2000 | Smith | 73/861.25 |
| 6,194,901 B1 | * | 2/2001 | Carton et al. | 324/434 |
| 6,477,140 B1 | * | 11/2002 | Uda et al. | 370/216 |
| 6,821,251 B2 | * | 11/2004 | Alexandru | 600/447 |
| 7,573,397 B2 | * | 8/2009 | Petrovic et al. | 340/854.6 |

(Continued)

*Primary Examiner* — Luke Ratcliffe
*Assistant Examiner* — Amienatta M Ndure Jobe
(74) *Attorney, Agent, or Firm* — Patrick Reilly

(57) ABSTRACT

Circuits, systems and methods that utilize two transducers, of which at least one is a piezoelectric transducer, adapted and coupled to receive and/or generate signals in the forms of sound waves, mechanical vibrations, and/or electromagnetic energy. In one version, two transducers each receive and/or generate separate vibrational energy signals that bear information. Two or more transducers coupled to a switching circuit may send or receive piezo-electrical circuit output signals that include a carrier wave having different frequencies that are within separate frequency ranges. Two or more transducers may generate output signals that are simultaneously processed by or multiplexed by a switching circuit.

20 Claims, 7 Drawing Sheets

(56) References Cited

U.S. PATENT DOCUMENTS

| | | | |
|---|---|---|---|
| 7,764,601 B2* | 7/2010 | Murai | 370/219 |
| 9,005,263 B2* | 4/2015 | Boyden et al. | 607/96 |
| 2002/0021468 A1* | 2/2002 | Kato et al. | 359/152 |
| 2009/0015096 A1* | 1/2009 | Puskas | 310/317 |
| 2013/0113336 A1* | 5/2013 | Spigelmyer et al. | 310/314 |

* cited by examiner ature and further features of the invention, may be better understood with reference to the accompanying specification and drawings depicting the preferred embodiment, in which:

CIRCUITS, SYSTEMS AND METHODS OF HYBRID ELECTROMAGNETIC AND PIEZOELECTRIC COMMUNICATORS

TECHNICAL FIELD

The present invention relates to communication circuits, systems and methods. More particularly, the present invention relates to circuits that employ sound wave, mechanical vibration, and/or electromagnetic wave energy to transfer information.

BACKGROUND

Electromagnetic wave energy, such as radio frequency (RF) waves and light, has been widely used to transmit information-bearing signals, but can be easily intercepted. The prior art further includes the transmission of information bearing signals in the mode of sound waves (such as acoustic waves and ultrasonic waves), pressure waves, or other types of mechanical vibrations with piezoelectric transducers. Compared to electromagnetic wave energy, sound wave energy is optimal for signal transmission in certain environments. For example, sound wave can pass through a Faraday cage. Also, certain types of sound waves, such as ultrasonic waves and acoustic waves, have a very limited propagation range, and thus make the interception of signal outside such a short propagation range impossible. However, no optimal combination of both forms of communications has been established. Therefore, there is a long-felt need for circuits, systems and methods that utilize both electromagnetic wave and sound wave to receive and/or generate signals.

In addition, different sound wave transducing media have different characteristics. There is also a long-felt need for circuits, systems and methods that enable transmission of signals in the form of sound wave energy in a complex environment that is composed of multiple sound wave transducing media. The present invention is offered to meet these two stated objects and other objects that are made obvious in light of the present disclosure.

SUMMARY AND OBJECTS OF THE PRESENT INVENTION

This Summary is provided to introduce a selection of concepts in a simplified form that are further described below in the Detailed Description. This Summary is not intended to identify key features or essential features of the claimed subject matter, nor is this Summary intended to be used to limit the scope of the claimed subject matter.

Described embodiments provide hybrid communicator circuits, systems, and methods. In one embodiment, such a communicator circuit is adapted to couple with an output target circuit to which it transmits an output signal. Such a communicator circuit may include a first signal front end adapted for coupling with the first piezoelectric transducer; a second signal front end adapted for coupling with the second transducer; and/or a switching circuit coupled to the first signal front end, the second signal front end, and a processing circuit. The switching circuit is adapted to enable a transmission of a switching circuit output signal to the processing circuit. The processing circuit is disposed between the switching circuit and the output target circuit and adapted to receive the switching circuit output signal and transmit an output signal to the output target circuit. The switching circuit output signal is substantively derived from a first signal received from the first piezoelectric transducer and a second signal received from the second transducer. The output signal substantively derived from the switching output signal.

Various alternate preferred embodiments of the invented method employ more than one transducer to simultaneously or near-simultaneously send and/or receive information bearing pressure wave signals.

BRIEF DESCRIPTION OF THE DRAWINGS

These, and further features of the invention, may be better understood with reference to the accompanying specification and drawings depicting the preferred embodiment, in which.

DETAILED DESCRIPTION

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events, which are logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
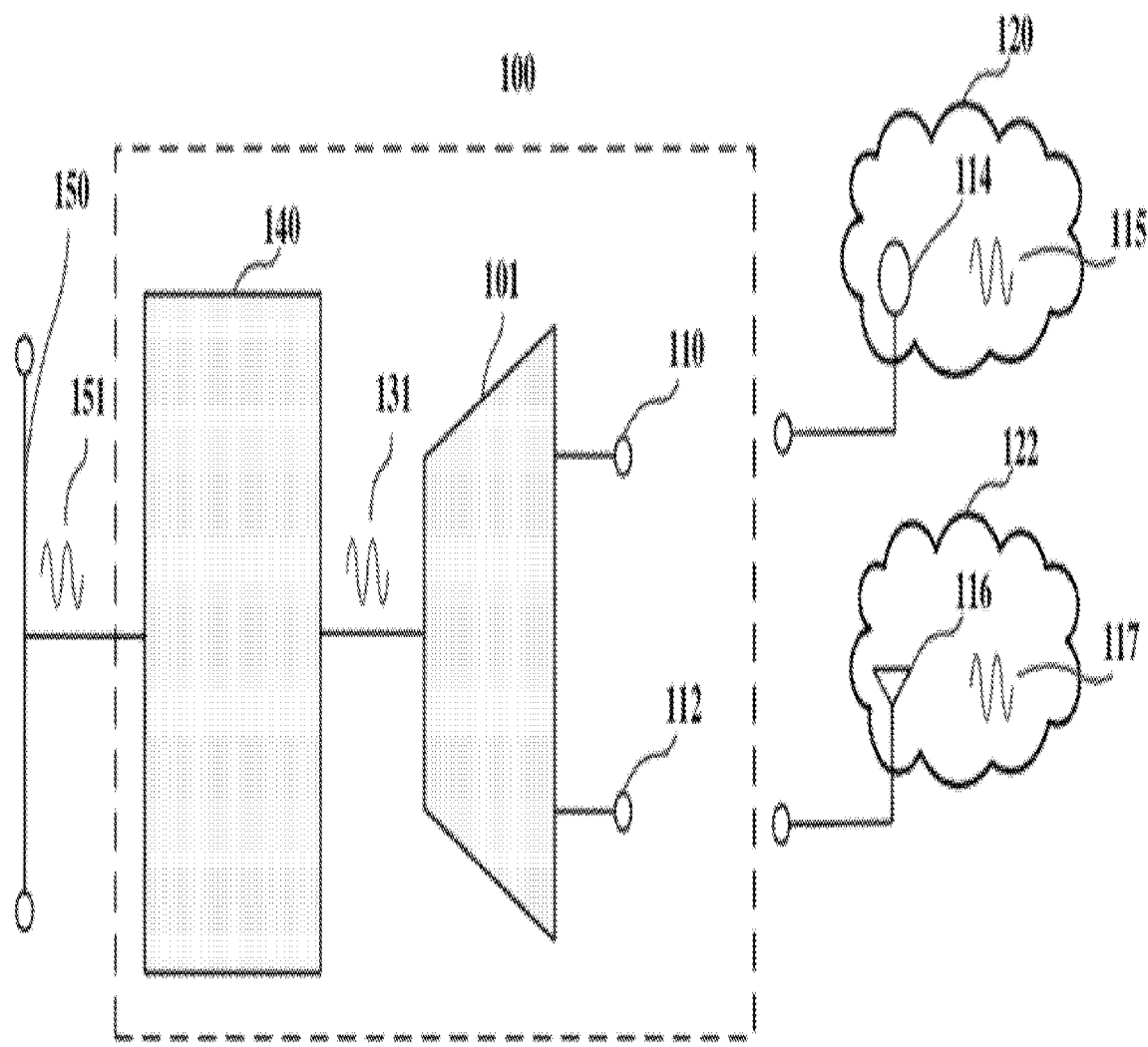
FIG. 1 is a block diagram of a first embodiment of the invented communicator circuit.

FIG. 1 illustrates a first communicator circuit 100 according to one embodiment. As shown in FIG. 1, the first communicator circuit 100 includes a front-end circuit 101, a first signal front end 110, and a second signal front end 112. The first signal front end 110 is adapted for electrically coupling with a first piezoelectric transducer 114. The piezoelectric transducer 114 is a device that is capable of converting a piezo-signal 115 to electric signals. According to several embodiments, the piezo-signal 115 can be sonic waves, ultrasonic waves, pressure waves, or other types of mechanical vibrations. Conversely, such piezoelectric transducer may also be capable of converting electric signals to the piezo-signal 115. In one embodiment, the piezoelectric transducer 114 is or comprises an ultrasonic transducer, such as a ceramic transducer APC International, Ltd. with an address at 46 Heckman Gap Road, Mill Hall, Pa. 17751, USA, or other suitable piezoelectric transducer known in the art. The second signal front end 112 is adapted for electronic coupling with a second transducer 116 that is adapted for converting a second signal 117 to electric signals or vice versa. In one embodiment, the second transducer 116 is a second piezoelectric transducer. According to a yet further embodiment of the invention, the second transducer 116 is an electromagnetic transducer. The electromagnetic transducer 116 is a device capable of converting electric signals to electromagnetic signals. The electromagnetic signals may be either electric signals, or magnetic signals, or electromagnetic signals. Conversely, the electromagnetic transducer 116 may also be capable of converting electromagnetic signals to electric signals. In one embodiment, the electromagnetic transducer 116 is a radio frequency transmitter and/or receiver. In another embodiment, the electromagnetic transducer 116 is an optical transmitter and/or receiver. In yet another embodiment, the electromagnetic transducer 116 is an infrared transmitter and/or receiver. The front-end circuit 101 is electrically coupled with both the first signal front end 110 and the second signal front end 112. The front-end circuit 101 is adapted for electrically coupling with, and transmitting a switching circuit output signal 131 to a processing circuit 140. The processing circuit 140 is electrically coupled with and disposed between the frond-end circuit 101 and the output target circuit 150, and is adapted to receive the switching circuit output signal 131 and transmit an output signal 151 to the output target circuit 150. The switching circuit output signal 131 derives from the piezo-signal 115 that is received from the first piezoelectric transducer 114 and/or a second signal 117 that is received from the second transducer 116. The output signal 151 is substantively derived from the switching circuit output signal 131. In one embodiment, the piezo-signal 115 and the second signal 117 are the same signal. Besides the first signal front end 110 and the second signal front end 112, other embodiments may further include one or more signal front ends that are electronically coupled with the front-end circuit 101 and adapted for electronically coupling with other transducers, either electromagnetic or piezoelectric.

As illustrated in FIG. 1, the first piezoelectric transducer 114 can receive and/or transmit the piezo-signal 115 through a first piezo-conducting medium 120, which is capable of transporting pressure waves, vibrations, or other types of mechanical energy. The piezo-conducting medium 120 can be a solid material (for example, wood, metal, water pipes, drywall, electrical wires, or optical fibers), liquid material (for example, water), gaseous material (for example, air), or composite material (for example, human body). The second transducer 116 can receive and/or transmit the second signal 117 through a second communication medium 122. The second communication medium 122 can be a second piezo-conduction medium or an electromagnetic medium that is capable of transporting electric or electromagnetic energy. In one embodiment, the first piezo-conducting medium 120 and the second communication medium 122 are the same medium. Yet in another embodiment, the first piezo-conducting medium 120 and the second communication medium 122 are different and segregated mediums, and therefore, the piezo-signal 115 that is received and/or transmitted through the first piezo-electric transducer 114 do not interfere with the second signal 117 that is received and/or transmitted through the second transducer 116.

Figure 2:
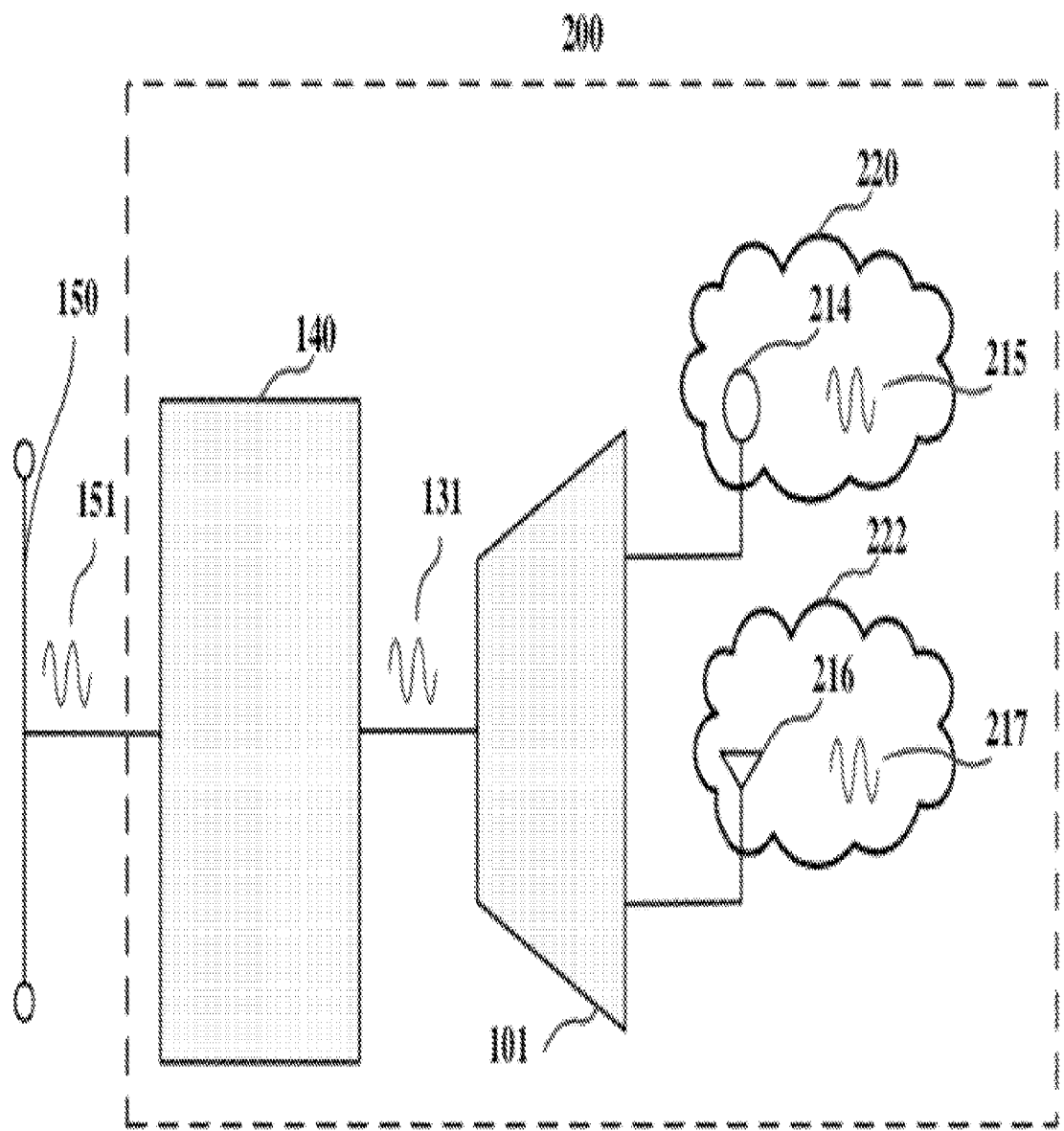
FIG. 2 is a block diagram of a second embodiment of the invented communicator circuit.

FIG. 2 illustrates a second communicator circuit 200 according to another embodiment of the invention. In contrast to the first communicator circuit 100 as shown in FIG. 1, the second communicator circuit 200 includes a first piezo-electric transducer 214 and a second transducer 216 both of which may be electrically coupled with the front-end circuit 101. The first peizo-electric transducer 214 is capable of receiving and/or transmitting a piezo-signal 215 through a first piezo-conducting medium 220. The second transducer 216 can be a second piezoelectric transducer or an electromagnetic transducer. The second transducer 216 is capable of receiving and/or transmitting a second signal 217 (being a piezo-signal or an electromagnetic signal) through a second communication medium 222. In one embodiment the piezo-signal 215 and the second signal 217 are components of a same signal energy. The first piezo-conducting medium 220 and the second communication medium 222 may be the same medium or different and segregated mediums according to various embodiments. The front-end circuit 101 is adapted for electrically coupling with, and transmitting a switching circuit output signal 131 to a processing circuit 140. The processing circuit 140 is electrically coupled with and disposed between the front-end circuit 101 and the output target circuit 150, and is adapted to receive the switching circuit output signal 131 and transmit an output signal 151 to the output target circuit 150.

Figure 3A:
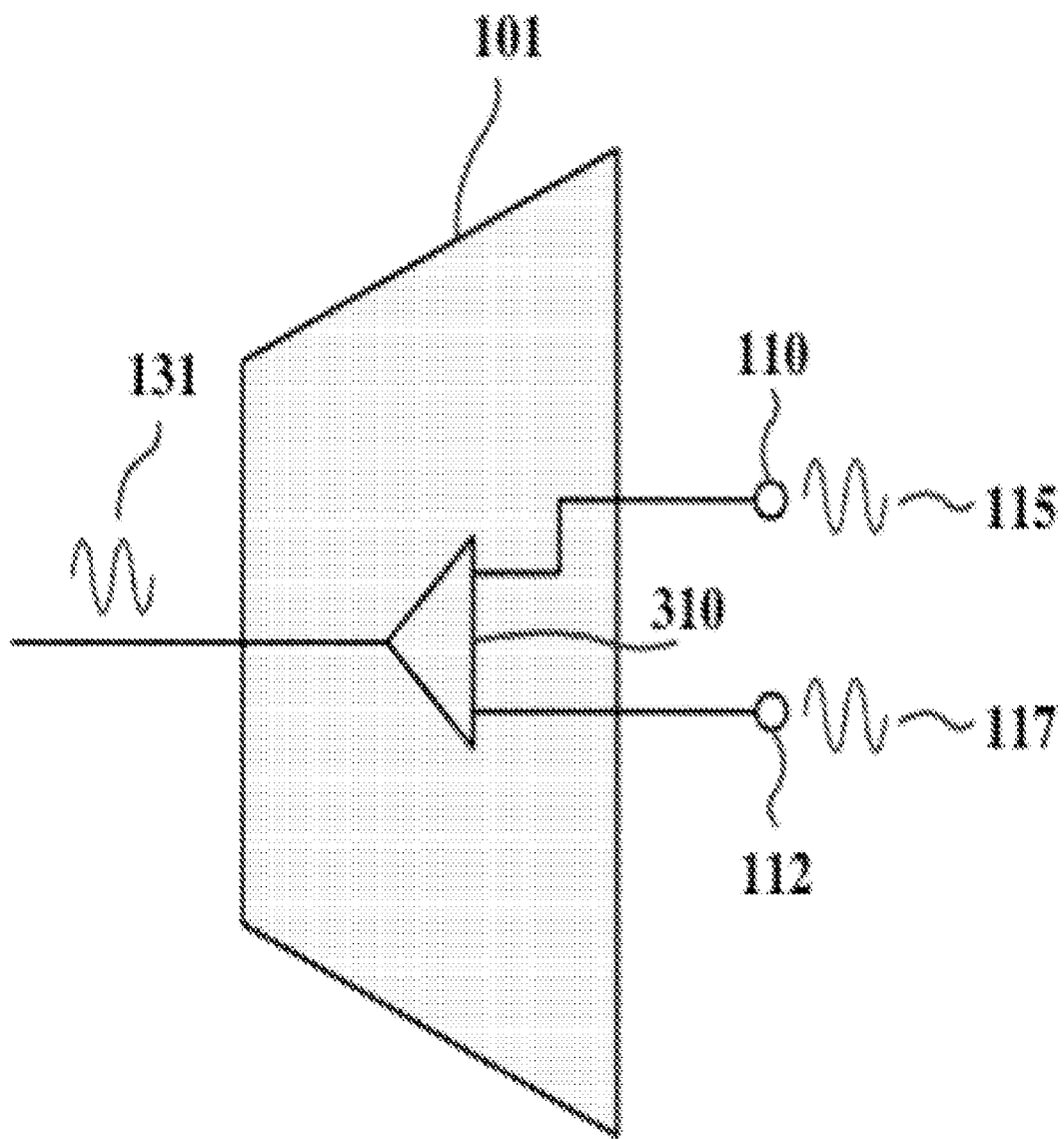
FIG. 3A is a block diagram of a first version of the front-end circuit of FIG. 1 or FIG. 2.
Figure 3B:
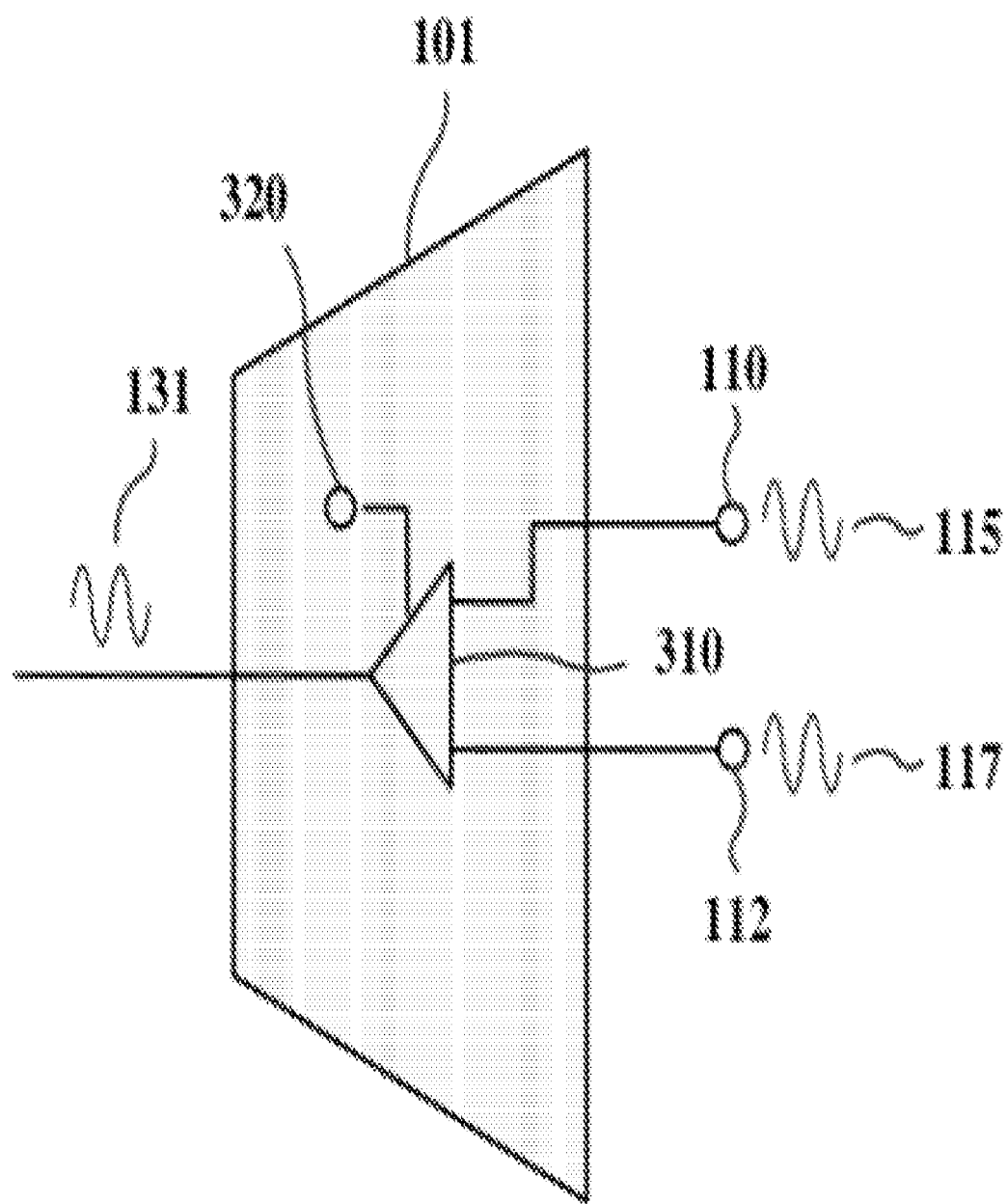
FIG. 3B is a block diagram of a second version of the front-end circuit of FIG. 1 or FIG. 2.

FIG. 3A and FIG. 3B further illustrate the internal modules 310 and 320, as well as the operating mechanism of the front-end circuit 101 that is shown in FIG. 1 and FIG. 2 according to several embodiments.

In one embodiment shown in FIG. 3A and FIG. 1, the front-end circuit 101 includes a switching circuit 310 that is electrically coupled to both the first signal end 110 and the second signal end 112. The switching circuit 310 is adapted to selectively enable a transmission of the piezo-signal 115 that is substantively received from the first piezoelectric transducer 114 or the second signal 117 that is substantively received from the second transducer 116 as the switching circuit output signal 131 to the processing circuit 140. According to several embodiments, such selection is based on certain conditions. In one embodiment, the switching circuit 310 will transmit the second signal 117 as the switching circuit output signal 131 to the processing circuit 140, if the first piezo-signal 115 is unavailable. According to another embodiment, the switching circuit 310 shown in FIG. 3A can transmit a multiplex signal that is derived from the piezo-signal 115 and the second signal 117 as the switching circuit output signal 131 to the processing circuit 140. Yet according to another embodiment, the switching circuit 310 shown in FIG. 3A can transmit a summed signal that is composed of the piezo-signal 115 and the second signal 117 as the switching circuit output signal 131 to the processing circuit 140.

According to one embodiment, shown in FIG. 3B and FIG. 1, the front-end circuit 101 includes a switching circuit 310 that is electrically coupled to both the first signal end 110 and the second signal end 112, and a processor 320 that is electrically coupled to the switching circuit 310. According to several embodiments, the processor 320 is adapted to direct the switching circuit 310 to transmit one of the following signal as the switching circuit output signal 131 to the output target circuit 140: the piezo-signal 115, the second signal 117, the multiplex signal that is derived from the piezo-signal 115 and the second signal 117, the summed signal that is composed of the piezo-signal 115 and the second signal 117. Yet in another embodiment, the processor 320 is adapted to direct the switching circuit 310 to transmit no signal to the output target circuit 140.

Figure 4A:
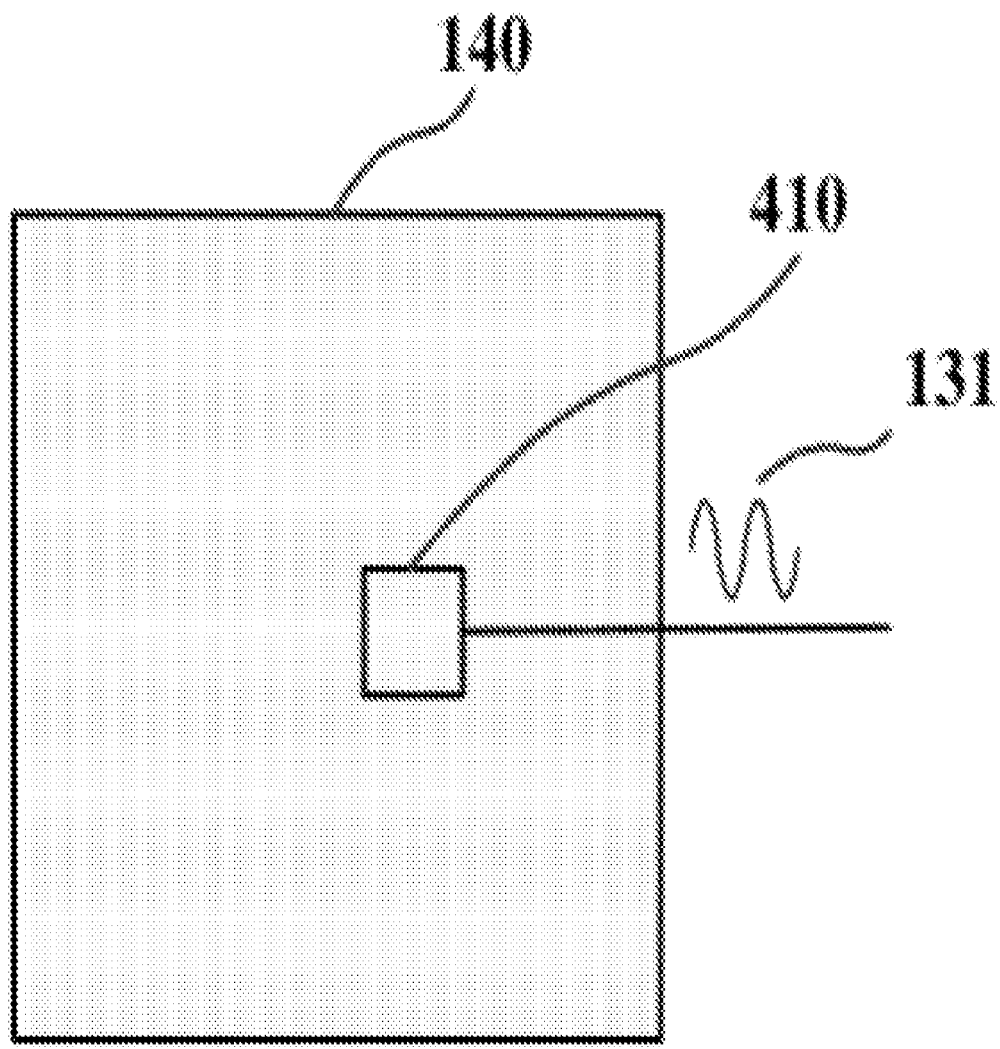
FIG. 4A is a block diagram of a first version of the processing circuit of FIG. 1 or FIG. 2.
Figure 4B:
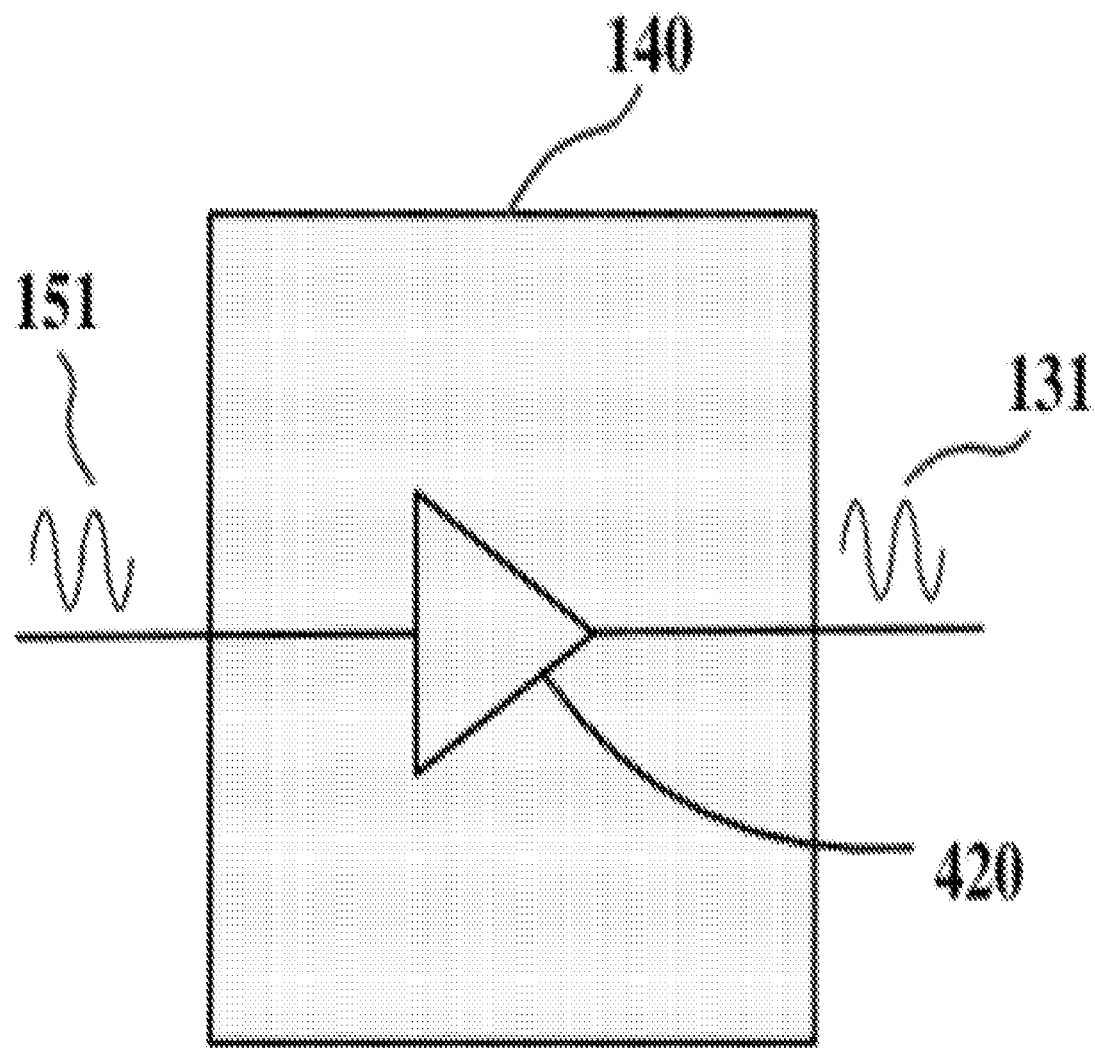
FIG. 4B is a block diagram of a second version of the processing circuit of FIG. 1 or FIG. 2.
Figure 4C:
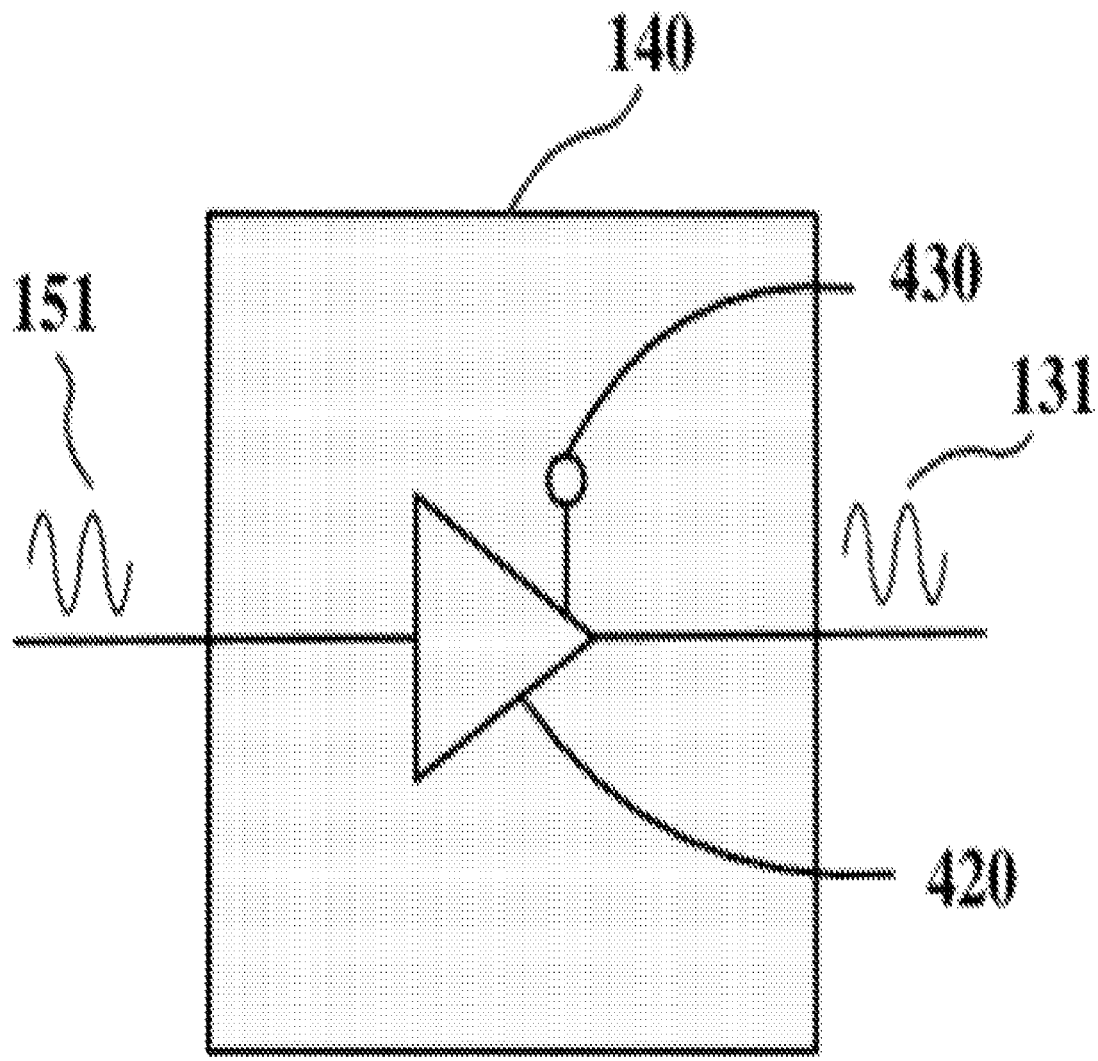
FIG. 4C is a block diagram of a third version of the processing circuit of FIG. 1 or FIG. 2.

FIG. 4A through FIG. 4C further illustrate the internal modules 410, 420 and 430, as well as the operating mechanism of the processing circuit 140 that is shown in FIG. 1 and FIG. 2 according to several embodiments.

In one embodiment, illustrated in FIG. 4A and FIG. 1, the processing circuit 140 includes a memory storage module 410 that is electrically coupled to the switching circuit 310 and adapted to receive from the switching circuit 310 and record the switching circuit output signal 131.

In another embodiment shown in FIG. 4B and FIG. 1, the processing circuit 140 includes a communications module 420 that is electrically coupled to the switching circuit 310 and adapted to receive and transmit the switching circuit output circuit 131 to the output target circuit 150. In one embodiment, the communications module 420 shown in FIG. 4B is further adapted to generate a pressure-wave output signal that is substantively derived from the switching circuit output signal 131. In another embodiment, the communications module 420 shown in FIG. 4B is further adapted to generate an electromagnetic output signal that is substantively derived from the switching circuit output signal 131. In yet another embodiment the communications module 420 shown in FIG. 4B is adapted to generate a pressure-wave output signal and/or an electromagnetic output signal. According to several embodiments, the pressure-wave output signal can be redirected directly, through the switching circuit 310, or through other circuits, to the first piezoelectric transducer 114, while the electromagnetic output signal can be redirected directly, through the switching circuit 310, or through other circuits, to the second transducer. As a result, the pressure-wave output signal can be converted to pressure waves that are transmitted through the first piezo-conducting medium 120, while the electromagnetic output signal can be converted to electromagnetic energy that is transmitted through the second communication medium 122. According to several other embodiments, the pressure-wave output signal and the electromagnetic output signal that are generated by the communications module 420 can be redirected to other transducers.

According to another embodiment that is illustrated in FIG. 4C, the processing circuit 140 can further include a transmission logic module 430. The transmission logic module 430 is electrically coupled with the communications module 420. According to several embodiments, the transmission logic module 430 is adapted to direct the communications module 420 to transmit one of the following signals as the output signal 151 to the output target circuit 150: the pressure-wave output signal generated by the communications module 420, the electromagnetic output signal generated by the communications module 420, a multiplex signal derived from the pressure-wave output signal and the electromagnetic output signal, and a summed signal substantively composed of a combination of the pressure-wave output signal and the electromagnetic output signal. In one embodiment, the transmission logic module 430 shown in FIG. 4C is electrically coupled with the processor 320 shown in FIG. 3B. In another embodiment, a single processor can function as both the transmission logic module 430 shown in FIG. 4C and the processor 320 shown in FIG. 3B.

The foregoing disclosures and statements are illustrative only of the Present Invention, and are not intended to limit or define the scope of the Present Invention. The above description is intended to be illustrative, and not restrictive. Although the examples given include many specificities, they are intended to be illustrative only of certain possible configurations or aspects of the Present Invention. The examples given should only be interpreted as illustrations of some of the preferred configurations or aspects of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the present invention as disclosed and claimed should, therefore, be determined with reference to the knowledge of one skilled in the art and in light of the disclosures presented above.

We claim:

1. A communicator circuit, the communicator circuit adapted for coupling with a first piezoelectric transducer, a second transducer, and an output target circuit, the communicator circuit comprising:
   a first signal front end communicatively coupled with the first piezoelectric transducer;
   a second signal front end communicatively coupled with the second transducer;
   a switching circuit communicatively coupled with the first signal front end, the second signal front end, and a processing circuit; and
   the processing circuit communicatively coupled with the output target circuit, wherein the switching circuit is adapted to enable a transmission of a switching circuit output signal to the processing circuit, and the processor circuit is enabled to receive the switching circuit output signal and therefrom modify, derive, generate and transmit a resultant output signal that is a selectively an electromagnetic signal or a pressure wave signal.

2. The communicator circuit of claim 1, wherein the second transducer is a second electromagnetic transducer.

3. The communicator circuit of claim 1, wherein the second transducer is a second piezoelectric transducer.

4. The communicator circuit of claim 1, wherein the switching circuit is further adapted to selectively enable a transmission of a signal derived from energy detected by the first signal front end or the second signal front end as the switching circuit output signal to the processing circuit.

5. The communicator circuit of claim 1, wherein the switching circuit is further adapted to transmit a multiplex signal as the switching circuit output signal to the processing circuit, the multiplex signal derived from a combination of energy transmitted from the first signal front end and the second signal front end.

6. The circuit in claim 5 further comprising a processor, the processor coupled to the switching circuit and adapted to selectively direct the switching circuit to transmit the multiplex signal to the processing circuit.

7. The communicator circuit of claim 1, wherein the switching circuit is further adapted to simultaneously transmit a summed signal as the switching circuit output signal to the processing circuit, the summed signal substantively derived from a combination of energy detected by the first signal front end and the second signal front end.

8. The communicator circuit of claim 7 further comprising a processor, the processor coupled to the switching circuit and adapted to selectively direct the switching circuit to transmit the summed signal to the processing circuit, the first piezoelectric transducer, and/or the second transducer.

9. The communicator circuit of claim 1 further comprising a processor, the processor coupled to the switching circuit and adapted to direct the switching circuit between a first state of transmitting a first signal received from the first front end as the switching circuit output signal to the processing circuit or a second state of transmitting a second signal received from the second front end as the switching circuit output signal to the processing circuit.

10. The communicator circuit of claim 9, wherein the processor is further adapted to alternately direct the switching circuit into a third state of not transmitting any signal to the processing circuit.

11. The communicator circuit of claim 1, wherein the processing circuit comprises a first memory storage module, the first memory storage module coupled with the switching circuit and adapted to receive and record the switching circuit output signal.

12. The communicator circuit of claim 1, wherein the processing circuit comprises a communications module, the communications module coupled with the switching circuit and the communications module adapted to receive and transmit the switching circuit output signal as the output signal to the output target circuit and/or to the first piezoelectric transducer and/or the second transducer.

13. The communicator circuit of claim 12 wherein the communications module is further adapted to generate a pressure-wave output signal substantively derived from the switching circuit output signal.

14. The communicator circuit of claim 12 wherein the communications module is further adapted to generate an electromagnetic output signal substantively derived from the switching circuit output signal.

15. The communicator circuit of claim 13, wherein the communications module is further adapted to generate an electromagnetic output signal substantively derived from the switching circuit output signal.

16. The communicator circuit of claim 15, wherein the processing circuit further comprises a transmission logic module, the transmission logic module coupled with the communications module and the transmission logic module adapted to selectively direct the communications module to transmit the pressure-wave output signal or the electromagnetic output signal.

17. The communicator circuit of claim 16, wherein the transmission logic module is further adapted to selectively direct the communications module to transmit a multiplex signal as the output signal to the output target circuit, the multiplex signal derived from the pressure-wave output signal and the electromagnetic output signal.

18. The communicator circuit of claim 16, wherein the transmission logic module is further adapted to selectively direct the communications module to transmit a summed signal as the output signal to the output target circuit, the summed signal substantively composed of a combination of the pressure-wave output signal and the electromagnetic output signal.

19. A communicator circuit, the communicator circuit adapted for coupling with an output target circuit, the communicator circuit comprising:
 a first piezoelectric transducer;
 a second transducer;
 a switching circuit bi-directionally communicatively coupled with the first piezoelectric transducer, the second transducer; and
 a processing circuit, the processing circuit coupled with the switching circuit and the output target circuit, wherein the switching circuit is adapted to selectively enable a transmission of a switching circuit output signal to the processing circuit, the first piezoelectric transducer and the second transducer, whereby the communicator circuit is adapted to receive signals from the first piezoelectric transducer, the second transducer, and the output target circuit and therefrom derive, generate and selectively transmit the switching circuit output signal to the first piezoelectric transducer, the second transducer and/or the output target circuit.

20. The communicator circuit of claim 19, wherein the second transducer is a second electromagnetic transducer.

* * * * *